(12) United States Patent
Wei et al.

(10) Patent No.: US 9,402,260 B2
(45) Date of Patent: Jul. 26, 2016

(54) METHOD AND DEVICE FOR IMPROVING CELL THROUGHPUT BASED ON STREAMING MEDIA SERVICE

(71) Applicant: Huawei Technologies Co., Ltd., Shenzhen, Guangdong (CN)

(72) Inventors: Anni Wei, Beijing (CN); Dengkun Xiao, Beijing (CN); Lei Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 14/291,362

(22) Filed: May 30, 2014

(65) Prior Publication Data

US 2014/0269584 A1    Sep. 18, 2014

Related U.S. Application Data

(63) Continuation of application No. PCT/CN2012/085738, filed on Dec. 3, 2012.

(30) Foreign Application Priority Data

Dec. 1, 2011 (CN) .......................... 2011 1 0393247

(51) Int. Cl.
*H04W 72/04* (2009.01)
*H04L 29/06* (2006.01)

(52) U.S. Cl.
CPC ..... *H04W 72/0473* (2013.01); *H04L 29/06482* (2013.01); *H04L 29/06489* (2013.01); *H04L 65/80* (2013.01)

(58) Field of Classification Search
None
See application file for complete search history.

(56) References Cited

U.S. PATENT DOCUMENTS 8,184,572 B1 * 5/2012 Kraus ............... H04W 72/1257
370/322
2010/0041408 A1 * 2/2010 Caire .................... H04L 5/0007
455/446

(Continued)

FOREIGN PATENT DOCUMENTS

CN          1997180 A       7/2007
CN        101383775 A       3/2009

(Continued)

OTHER PUBLICATIONS

Davy Van Deursen, et al., "On Media Delivery Protocols in the Web", IEEE, Jul. 19, 2010, p. 1028-1033.

(Continued)

*Primary Examiner* — Donald Mills

(57) ABSTRACT

Embodiments of the present invention provide a method and a system for improving a cell throughput based on a streaming media service. The method includes: pre-adjusting, according to a channel quality sampling value of two clients in the same cell that are performing a streaming media service, an air interface resource allocated to the two clients; acquiring a variation of a cell throughput that exists after the air interface resources of the two clients are pre-adjusted; and if the variation of the cell throughput that exists after the air interface resources of the two clients are pre-adjusted is greater than a preset resource adjustment threshold, allocating the pre-adjusted air interface resources to the two clients, so that the two clients two capable of receiving streaming media content having an adjusted code rate value from a media server.

22 Claims, 3 Drawing Sheets

(56) References Cited

U.S. PATENT DOCUMENTS

| | | | | |
|---|---|---|---|---|
| 2010/0159832 A1* | 6/2010 | Lagrange | H04W 40/12 | 455/41.2 |
| 2010/0311429 A1* | 12/2010 | Baker | H04L 1/0004 | 455/450 |
| 2010/0316115 A1* | 12/2010 | Zheng | H04B 7/0615 | 375/240.01 |
| 2012/0257686 A1* | 10/2012 | Scholand | H04W 52/262 | 375/295 |
| 2012/0275540 A1* | 11/2012 | Ozluturk | H04L 5/0025 | 375/295 |
| 2012/0307747 A1* | 12/2012 | MacInnis et al. | H04W 72/1252 | 370/329 |
| 2012/0314598 A1* | 12/2012 | Sadek | H04W 16/14 | 370/252 |
| 2013/0010844 A1* | 1/2013 | Amini | H04L 1/0015 | 375/219 |
| 2013/0195008 A1* | 8/2013 | Pelletier | H04B 7/0417 | 370/328 |

FOREIGN PATENT DOCUMENTS

| | | |
|---|---|---|
| CN | 101998640 A | 3/2011 |
| WO | WO 2011/047335 A1 | 4/2011 |

OTHER PUBLICATIONS

"Network Assistance Adaptation", Huawei Technologies Co., Ltd., TSG-SA4 #64 meeting, Apr. 11-15, 2011, 8 pages.

* cited by examiner

METHOD AND DEVICE FOR IMPROVING CELL THROUGHPUT BASED ON STREAMING MEDIA SERVICE

CROSS-REFERENCE TO RELATED APPLICATIONS

This application is a continuation of International Application No. PCT/CN2012/085738, filed on Dec. 3, 2012, which claims priority to Chinese Patent Application No. 201110393247.0, filed on Dec. 1, 2011, both of which are hereby incorporated by reference in their entireties.

TECHNICAL FIELD

The present invention relates to the field of communications technologies, and in particular, to a method and a device for improving a cell throughput based on a streaming media service.

BACKGROUND

Streaming media refers to multimedia content such as audios or videos by means of data stream issued on the Internet in real time. The streaming media technology refers to compressing and encoding a whole multimedia file into multiple compressed packages, and sequentially transmitting the multiple compressed packages to a client in real time, so that a user is capable of decompressing and playing a downloaded compressed package while downloading a subsequent compressed package, thereby saving time.

According to the existing HTTP Streaming protocol, a multimedia file which is sliced by a content preparation unit is encapsulated into media fragments conforming to a required format and description information about each media fragment is generated, and then, the media fragment and the description information about each media fragment are pushed to an HTTP Streaming server, where the description information about the media fragment describes content of the media fragment, a multi-code rate, and request address construction information of the media fragment. The HTTP Streaming server stores the media fragment, the description information about the media fragment, and responses media fragment request information from the client. The media fragment request of the client includes information such as a code rate, resolution and language of the requested media fragment. The code rate of the media fragment requested by the client is dynamically adjusted by the client according to the bandwidth of the client. If the client is in low bandwidth, the client requests the HTTP Streaming server for a low-code-rate media fragment; if the user is in high bandwidth, the client requests the HTTP Streaming server for a high-code-rate media fragment.

In a fixed network, a bandwidth resource relatively constant, the HTTP Streaming server can provide media fragments with different code rates according to different bandwidth resources, and code rate adaptation between the client and the HTTP Streaming server is relatively simple. However, for a wireless network, because an air interface resource changes continuously, the code rate adaptation needs to be performed on the code rate of the media fragment according to the change of the air interface resource.

Because each client can merely learn its own link situation when measuring its own bandwidth and adjust the code rate of the requested media fragment according to its own link situation, but cannot rationally utilize resources of a whole cell, which affects a throughput of the whole cell.

SUMMARY

Embodiments of the present invention provide a method and a device for improving a cell throughput based on a streaming media service, which enable resource allocation of a cell where a client is located to be more optimized, thereby improving a cell throughput.

In order to achieve the object, the embodiments of the present invention adopt the following technical solutions:

A method for improving a cell throughput based on a streaming media service is provided, which includes:

pre-adjusting air interface resources allocated to two clients that are performing a streaming media service in the same cell, where the pre-adjusting the air interface resources is pre-adjusting the air interface resources of the two clients according to an air interface adjustment amount preset by a base station;

acquiring a variation of a cell throughput that exists after the air interface resources of the two clients are pre-adjusted; and if the variation of the cell throughput that exists after the air interface resources of the two clients are pre-adjusted is greater than a preset resource adjustment threshold, allocating the pre-adjusted air interface resources to the two clients, so that the two clients can receive streaming media content having an adjusted code rate value from a media server.

A device for improving a cell throughput based on a streaming media service is provided, which includes:

a pre-adjustment unit, configured to pre-adjust air interface resources allocated to two clients that are performing a streaming media service in the same cell, where the pre-adjusting the air interface resources is pre-adjusting the air interface resources of the two clients according to an air interface adjustment amount preset by a base station;

a throughput variation acquisition unit, configured to acquire a variation of a cell throughput that exists after the air interface resources of the two clients are pre-adjusted; and an adjustment unit, configured to: if the variation of the cell throughput that exists after the air interface resources of the two clients are pre-adjusted is greater than a preset resource adjustment threshold, allocate the pre-adjusted air interface resources to the two clients, so that the two clients can receive streaming media content having an adjusted code rate value from a media server.

The method and the device for improving a cell throughput based on a streaming media service according to the embodiments of the present invention are used to pre-adjust the air interface resources for each two clients in the same cell that are performing a streaming media service, and calculate whether a variation of a cell throughput that exists after the air interface resources is pre-adjusted is greater than a resource adjustment threshold, so as to determine whether it is worth performing, by a base station, an air interface resource adjustment action on the two clients. If the variation of the cell throughput that exists after the pre-adjustment is greater than the preset resource adjustment threshold, the pre-adjusted air interface resources is provided for the clients, so that the clients can receive, according to the pre-adjusted air interface resources allocated by the base station, streaming media content having an adjusted code rate value from a media server, thereby improving the cell throughput.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION

The technical solutions of the present invention are clearly described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Embodiment 1

Figure 1:
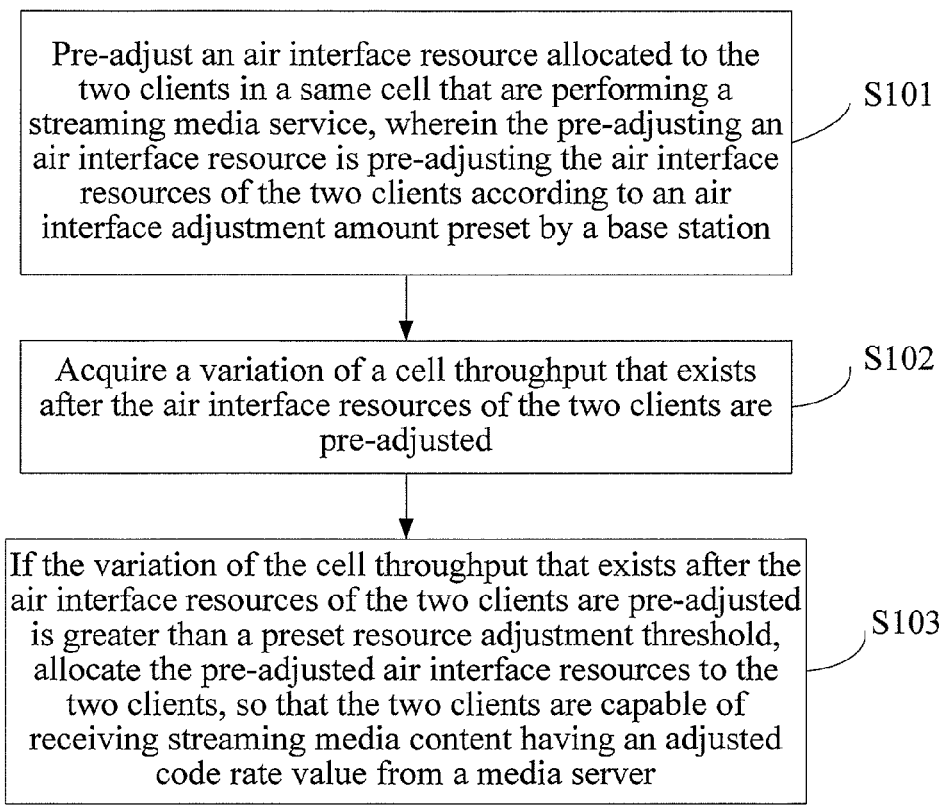
FIG. 1 is flowchart of a method for improving a cell throughput based on a streaming media service according to Embodiment 1 of the present invention.

The embodiment of the present invention provides a method for improving a cell throughput based on a streaming media service. As shown in FIG. 1, the method includes the following steps:

S101: For two clients in the same cell that are performing a streaming media service, pre-adjust air interface resources allocated to the two clients, where the pre-adjusting the air interface resources is pre-adjusting the air interface resources of the two clients according to an air interface adjustment amount preset by a base station.

First, the base station acquires a list of clients that are performing a streaming media service in a cell served by the base station; then, the base station groups, in a way of grouping any two clients, all the clients located in the cell served by the base station and performing the streaming media service, and pre-adjusts the air interface resources of the two clients in the same group. The pre-adjusted the air interface resources may be pre-adjusted according to a channel quality sampling value of the two clients in the same group, for example, the base station pre-adjusts transmit power allocated to the client, but not limited thereto. For example, the channel quality sampling value of a client j is 22, the transmit power currently allocated to the client j by the base station is $P_j$, the channel quality sampling value of a client i is 15, and the transmit power currently allocated to the client i by the base station is $P_i$. In this way, after the base station pre-adjusts the transmit power of the client j and the client i, the transmit power allocated to the client j with good channel quality is $P_j+\Delta P$, and the transmit power allocated to the client i with poor channel quality is $P_i-\Delta P$, where $\Delta P$ is a transmit power adjustment amount preset by the base station.

Specifically, the base station may adopt one or a combination of more of the parameters below to determine a channel quality of the two clients in the same group, for example, a distance between the two clients and the base station, a cache consumption rate of each client in a cache of the base station, a size of an RRSI (Received Signal Strength Indication, received signal strength indication), and a channel signal-to-noise ratio of the client, which is not limited in the present invention.

S102: Acquire a variation of a cell throughput that exists after the air interface resources of the two clients are pre-adjusted.

S103: If the variation of the cell throughput that exists after the air interface resources of the two clients are pre-adjusted is greater than a preset resource adjustment threshold, allocate the pre-adjusted air interface resources to the two clients, so that the two clients can receive streaming media content having an adjusted code rate value from a media server.

After the base station adjusts the air interface resource of a client, the client may monitor the air interface resource thereof in real time, and then determine whether to request the media server for media stream content having a code rate value higher than the code rate value of the currently received media stream content, or determine whether to request the media server for media stream content having a code rate value lower than the code rate value of the currently received media stream content. Definitely, the base station may also directly send code rate adjustment indication information to the client according to the adjusted air interface resource allocated to the client, so as to notify the client that the code rate value of the requested streaming media content may be adjusted.

The method and the device for improving a cell throughput based on a streaming media service according to the embodiments of the present invention are used to pre-adjust the air interface resources for two clients in the same cell that are performing a streaming media service, and calculate whether a variation of a cell throughput that exists after the air interface resource is pre-adjusted is greater than a resource adjustment threshold, so as to determine whether it is worth performing, by a base station, air interface resources adjustment on the two clients. If the variation of the cell throughput that exists after the pre-adjustment is greater than the preset resource adjustment threshold, the pre-adjusted air interface resource is provided for the clients, so that the clients can receive, according to the pre-adjusted air interface resource allocated by the base station, the streaming media content having an adjusted code rate value from a media server, thereby improving the cell throughput.

Embodiment 2

Figure 2:
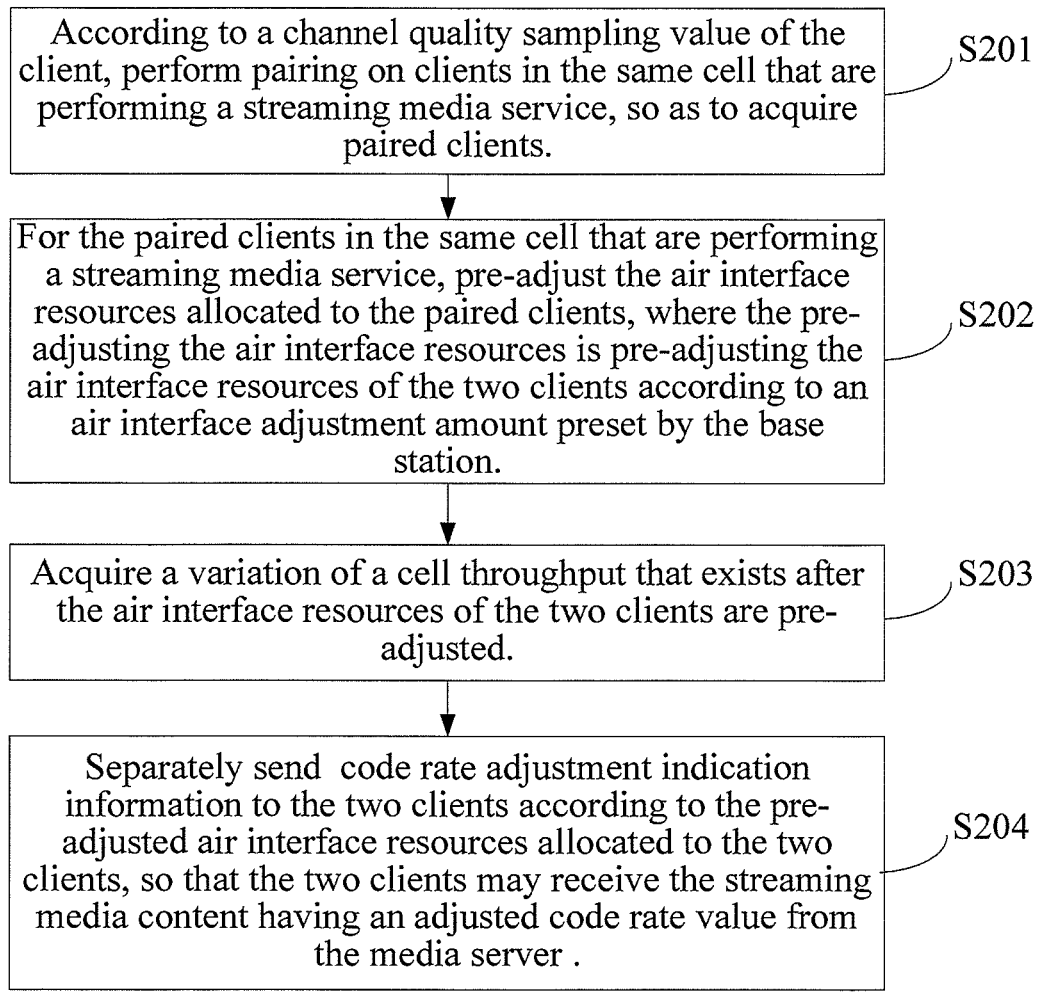
FIG. 2 is flowchart of a method for improving a cell throughput based on a streaming media service according to Embodiment 2 of the present invention.

The embodiment of the present invention provides a method for improving a cell throughput based on a streaming media service, where adjusting, by a base station, an air interface resource of a client according to this embodiment specifically is adjusting, by the base station, transmit power allocated to the client. As shown in FIG. 2, the method includes the following steps:

S201: According to a channel quality sampling value of the client, perform pairing on clients in the same cell that are performing a streaming media service, so as to acquire paired clients.

Specifically, the clients may be paired by using the following method: calculating a difference between a current channel quality sampling value of each client that is performing a streaming media service in the same cell and a channel quality sampling value of the client before a same time interval; according to a positive or negative value of the difference between the two channel quality sampling values of each client, dividing the clients in the cell that are performing a streaming media service into two groups; setting priority levels for a group that has the differences between the two channel quality sampling values being positive values in accordance with a descending order of the differences, and setting priority levels for the other group that has the differences between the two channel quality sampling values being negative values in accordance with an ascending order of the differences; and performing paring on clients with a same priority level in the two groups in sequence, so as to acquire paired clients.

For example, the time interval is 200 ms, a client that is performing a streaming media service in the cell reports the channel quality sampling value before 200 ms and the current channel quality sampling value, the base station calculates the difference $\Delta CQI$, between the current channel quality sampling value and the channel quality sampling value of the client before 200 ms. And then, clients are divided into two groups P and Q according to positive and negative values of $\Delta CQI$, as shown in Table 1 and Table 2, where Table 1 shows clients in the group P, and Table 2 shows clients in the group Q.

TABLE 1

$\Delta CQI$ of clients in the group P

| UE2 | UE4 | UE6 | UE8 | UE10 | UE22 | UE24 | UE26 | UE28 | UE30 | UE18 |
|---|---|---|---|---|---|---|---|---|---|---|
| 9 | 8 | 8 | 7 | 6 | 6 | 5 | 5 | 3 | 1 | 1 |

TABLE 2

$\Delta CQI$ of clients in the group Q

| UE11 | UE13 | UE15 | UE17 | UE19 | UE21 | UE23 | UE25 | UE29 | UE31 |
|---|---|---|---|---|---|---|---|---|---|
| −9 | −9 | −8 | −7 | −7 | −5 | −4 | −3 | −2 | −1 |

For the clients in the group P, priority levels are set for the clients in accordance with a descending order of $\Delta CQI$, the group P includes 11 clients, and the priority levels for the clients are 1, 2, 3, ..., and 11 in sequence. For the clients in the group Q, priority levels are set for the clients in accordance with an ascending order of $\Delta CQI$, the group Q includes 10 clients, and the priority levels for the clients are 1, 2, 3, ..., and 10 in sequence. And then, pairing is performed on the clients with the same priority level in the group P and the group Q. For example, UE2 and UE 11 are paired, and UE4 and UE 13 are paired. Then, the base station pre-increases the transmit power allocated to the clients participating the pairing in the group P and pre-decreases the transmit power allocated to the clients in the group Q.

Specifically, the pairing method may further be: evenly dividing the clients into a former group and a latter group in accordance with a descending order of the current channel quality sampling values of the clients, and separately setting priority levels for the two groups of clients in accordance with the channel quality sampling values; and performing paring on the clients with the same priority level in the two groups in sequence, so as to acquire the two paired clients. Then, the base station pre-increases the transmit power allocated to the client having a large channel quality sampling value in the paired clients, and pre-decreases the transmit power allocated to the client having a small channel quality sampling value in the paired clients.

For example, 9 clients are performing the streaming media service in the cell, the base station ranks the clients in accordance with the current channel quality sampling values reported by the 9 clients, and the ranking result is shown in Table 3.

TABLE 3

Channel quality sampling values of clients that are performing a streaming media Service in a Cell

| UE11 | UE13 | UE15 | UE17 | UE19 | UE23 | UE25 | UE29 | UE31 |
|---|---|---|---|---|---|---|---|---|
| 22 | 20 | 19 | 18 | 18 | 13 | 10 | 8 | 7 |

Then, according to the sequence of the clients, the clients are evenly divided into a former group and a latter group, namely, a group P and a group Q. The clients in the group P are specifically shown in Table 4, and the clients in the group Q are specifically shown in Table 5.

TABLE 4

Channel quality sampling values of clients that are in the group P

| UE11 | UE13 | UE15 | UE17 |
|---|---|---|---|
| 22 | 20 | 19 | 18 |

TABLE 5

Channel quality sampling values of clients in the group Q

| UE19 | UE23 | UE25 | UE29 | UE31 |
|---|---|---|---|---|
| 18 | 13 | 10 | 8 | 7 |

Then, the priority levels are set in accordance with the channel quality sampling values of the clients in the group P and the group Q, pairing is performed on the clients with the same priority level in the two groups, for example, the clients UE11 and UE19 are paired, and UE13 and UE23 are paired.

Specifically, the air interface resources of the two clients are pre-adjusted according to the channel quality sampling values of the two clients in the same cell that are performing a streaming media service. The air interface resource specifically may be the transmit power allocated to the client by the base station, and may also be a codeword resource of the client or bandwidth allocated to the client by the base station.

S202: For the paired clients in the same cell that are performing a streaming media service, pre-adjust the air interface resources allocated to the paired clients, where the pre-adjusting the air interface resources is pre-adjusting the air interface resources of the two clients according to an air interface adjustment amount preset by the base station.

The pre-adjusting, by the base station, the air interface resources of the paired clients specifically may be as follows:

The base station pre-increases the transmit power allocated to the client having a difference between the two channel quality sampling values being a positive value in the paired clients, and pre-decreases the transmit power allocated to the client having the difference between the two channel quality sampling values being a negative value in the paired clients, where the increased amount of the transmit power of the client whose allocated transmit power is pre-increased is the same as the decreased amount of the transmit power of the client whose allocated transmit power is pre-decreased. As shown in Table 1 and Table 2, the client UE2 and the client UE11 are paired, the transmit power pre-allocated to the client UE2 by the base station is $P_j+\Delta P$, and the transmit power allocated to the client UE11 is $P_i-\Delta P$, where $P_j$ is the transmit power currently allocated to the UE2, $P_i$ is the transmit power currently allocated i to the UE11, and $\Delta P$ is a transmit power adjustment amount preset by the base station.

The pre-adjusting, by the base station, the air interface resources of the paired clients specifically may be as follows:

The base station pre-increases the transmit power allocated to the client having a large channel quality sampling value in the paired clients, and pre-decreases the transmit power allocated to the client having a small channel quality sampling value in the paired clients, where the increased amount of the transmit power of the client whose allocated transmit power is pre-increased is the same as the decreased amount of the transmit power of the client whose allocated transmit power is pre-decreased. As shown in Tables 3, 4, and 5, the channel quality sampling value of the client UE11 is 22, the transmit power allocated to the client UE11 by the base station is $P_j$, the channel quality sampling value of the client UE19 is 18, and the transmit power allocated to the client UE19 by the base station is $P_i$. In this way, after the base station pre-adjusts the transmit power of the client UE11 and the client UE19, the transmit power allocated to the client UE11 by the base station is $P_j+\Delta P$, and the transmit power allocated to the client UE19 is $P_i-\Delta P$, where $\Delta P$ is the transmit power adjustment amount preset by the base station.

In this embodiment, the channel quality sampling value may be one or a combination of more of parameters below, for example, a distance between the two clients and the base station, a cache consumption rate of each client in a cache of the base station, a size of an RRSI (Received Signal Strength Indication, received signal strength indication), and a channel signal-to-noise ratio of the client, which is not limited herein by the present invention.

S203: Acquire a variation of a cell throughput that exists after the air interface resources of the two clients are pre-adjusted.

The base station calculates, according to the air interface resources pre-adjusted for the two clients, the throughputs of the two clients after the air interface resources are pre-adjusted, where a throughput specifically may be a service transmit rate of a client. Then, the base station calculates a difference between the throughputs of the two clients to obtain the variation of the cell throughput. Specifically, the following method for calculating the variation of the cell throughput may be adopted:

$$\Delta T = \frac{W}{L} * \frac{(P_j+\Delta P)*G}{RSSI_j-(P_j+\Delta P)*G} - \frac{W}{L} * \frac{(P_i+\Delta P)*G}{RSSI_j-(P_i+\Delta P)*G}$$

where $\Delta T$ is the variation of the cell throughput, W, L, and G represent bandwidth, user service quality, and channel large-scale loss of a cell, respectively; W and L have fixed values of 3.84 MHZ and 4.8 dB, respectively; G is a predicted value; $RSSI_j$ and $RSSI_i$ are a total receiving power of the client i and the client j, respectively; $P_j$ and $P^i$ are the transmit power currently allocated to the client i and the client j by the base station, respectively; and $\Delta P$ is the transmit power adjustment amount preset by the base station.

If the variation of the cell throughput that exists after the air interface resources of the two clients are pre-adjusted is greater than a preset resource adjustment threshold, allocate the pre-adjusted air interface resources to the two clients, so that the two clients can receive streaming media content having an adjusted code rate value from a media server.

The resource adjustment threshold is a value preset by the base station, and is used by the base station to determine whether it is worth performing, by the base station, air interface resources adjustment on the two clients.

If the variation of the cell throughput that exists after the air interface resources of the two clients are pre-adjusted is greater than the preset resource adjustment threshold, the base station deems that after the air interface resource of the client is adjusted, the increased amount of the cell throughput is acceptable. In this way, the base station separately allocates the pre-adjusted air interface resources to the two clients, so that the two clients can receive the streaming media content having an adjusted code rate value from the media server.

S204: Separately send code rate adjustment indication information to the two clients according to the pre-adjusted air interface resources allocated to the two clients, so that the two clients may receive the streaming media content having an adjusted code rate value from the media server.

Specifically, the code rate adjustment indication information separately sent to the two clients according to the pre-adjusted air interface resources allocated to the two clients by the base station may specifically be: code rate increasing indication information and code rate decreasing indication information. If the base station increases the transmit power allocated to the client, the base station may send information of increasing the code rate value of a requested streaming media content to the client; and if the base station decreases the transmit power allocated to the client, the base station may send information of decreasing the code rate value of the requested streaming media content to the client.

Specifically, the code rate adjustment indication information separately sent to the two clients according to the pre-adjusted air interface resources allocated to the two clients by the base station may specifically also be: streaming media content having an adjusted code rate value. If the base station increases the transmit power allocated to the client, the base station may send streaming media content having an increased code rate value to the client; and if the base station decreases the transmit power allocated to the client, the base station may send streaming media content having a decreased code rate value to the client.

Specifically, the code rate adjustment indication information separately sent to the two clients according to the pre-adjusted air interface resources allocated to the two clients by the base station may specifically also be: resource address information of the streaming media content having an adjusted code rate value. If the base station increases the transmit power allocated to the client, the base station may send resource address information of streaming media content having a code rate value one level higher than the code rate value of the streaming media content currently requested by the client. If the base station increases the transmit power allocated to the client, the base station may send resource address information of streaming media content having a code rate value one level lower than the code rate value of the streaming media content currently requested by the client.

For example, the code rate of a streaming media resource currently stored by the media server includes:
Code rate (bps)
350000
470000
630000
845000
1130000

If the code rate value of the media resource content currently requested by the client j is 630000 bps, the code rate value of the media resource content currently requested by the client i is 470000 bps, when the variation of the cell throughput ΔT after the air interface resource is adjusted is greater than the preset resource adjustment threshold, the base station increases the transmit power allocated to the client j by ΔP, and decreases the transmit power allocated to the client i by ΔP. In this way, the code rate value of the streaming media content requested by the client j can be increased to 845000 bps, and the code rate value of the streaming media content requested by the client i can be decreased to 350000 bps.

In this way, the base station may send information of increasing the code rate value of the requested streaming media content to the client j, for example, information of increasing to 845000 bps, and send information of decreasing the code rate of the requested streaming media content to the client i, for example, information of decreasing to 370000 bps.

Definitely, the base station may also directly acquire streaming media content having code rates of 845000 bps and 370000 bps and separately send the streaming media content to the client j and the client i.

Definitely, the base station may acquire storage address information of the streaming media content having a code rate of 845000 bps and a code rate of 370000 bps, and directly separately send the storage address information to the client j and the client i, separately.

In this way, the client does not need to monitor the bandwidth thereof in real time so as to switch the code rate value of the requested streaming media content, but only needs to receive the code rate adjustment indication information sent by the base station to perform code rate switching directly, so that the load of the client is decreased and the code rate value of the requested streaming media content can be switched in time.

Furthermore, before step S204, the method further includes: determining whether a variation of the throughput before and after the adjustment of the transmit power allocated to the two clients is greater than a code rate switching threshold, where the code rate switching threshold is a value preset by the base station.

If the variation of the throughput before and after the adjustment of the transmit power allocated to the client whose allocated transit power is increased is greater than the code rate switching threshold, code rate increasing indication information is sent to the client; if the variation of the throughput before and after the pre-adjustment of the transmit power allocated to the client whose allocated transit power is decreased is greater than the code rate switching threshold, code rate decreasing indication information is sent to the client; and if the variation of the throughput before and after the adjustment of the transmit power allocated to the two clients is less than the code rate switching threshold, code rate unchanging indication information is sent to the client.

Definitely, the code rate adjustment indication information sent to the client by the base station specifically may also be the code rate increasing indication information and code rate decreasing information, or the streaming media content having an adjusted code rate value, or the resource address information of the streaming media content having an adjusted code rate value.

Specifically, the throughput before and after the adjustment of the air interface resource of the client may be calculated by according to the following equation:

$$\Delta T_j = V_{j\Delta p} - V_j = \frac{W}{L} * \frac{(P_j + \Delta P) * G}{RSSI_j - (P_j + \Delta P) * G} - \frac{W}{L} * \frac{P_j * G}{RSSI_j - P_j * G}$$

where $V_{j\Delta p}$ is the code rate value of the transmit power allocated to the client i after the adjustment, $V_j$ the code rate value of the transmit power allocated to the client j before the adjustment, ΔP is a transmit power adjustment amount preset by the base station, and meanings of other parameters are the same as those in the equation above.

The transmit power allocated to the client j is increased by ΔP, accordingly, the transmit power allocated to the client i paired with the client j is decreased by ΔP, which specifically is:

$$\Delta T_i = V_i - V_{i\Delta p} = \frac{W}{L} * \frac{P_i * G}{RSSI_i - P_i * G} - \frac{W}{L} * \frac{(P_i - \Delta P) * G}{RSSI_i - (P_i + \Delta P) * G}$$

For example, when the code rate value of the streaming media content currently requested by the client j is 630000 bps, the code rate value of the streaming media content currently requested by the client is 470000 bps, if the code rate threshold specifically is 180000 bps, when the variation of the throughput $\Delta T_j$ before and after the base station adjusts the transmit power of the client j is greater than 180000 bps, the client may request a code rate value of 845000 bps, and when the $\Delta T_i$ is less than 180000 bps, the code rate value of the streaming media requested by the client may keep unchanged. Definitely, when $\Delta T_i$ is greater than 180000 bps, the code rate value of the streaming media requested by the client needs to be decreased to 350000 bps, so as to ensure that the client can browse the streaming media content smoothly.

In this way, before the base station sends the code rate adjustment indication information to the client, the variation of the throughput of the client is further determined, so as to determine whether the code rate value of the requested streaming media content can be adjusted after the air interface resource is adjusted, so that in the case that the cell throughput is increased, it is ensured that the client can browse the streaming media content smoothly.

The method for improving a cell throughput based on a streaming media service according to the embodiment of the present invention is used to pre-adjust the air interface resources for any two clients in the same cell that are performing a streaming media service, and determine whether a difference of the code rates of the each two clients after the pre-adjustment is greater than a resource adjustment threshold, so as to determine whether it is worth performing, by a base station, air interface resources adjustment action on the paired clients. If the difference of the code rates of the paired clients after the pre-adjustment is greater than the resource adjustment threshold, the pre-adjusted air interface resource is provided for the client, thereby improving the cell throughput.

Furthermore, the base station may also provide code rate indication information according to the pre-adjusted air interface resource provided for the client, so that the client can adjust the code rate of the requested streaming media without automatically detecting the air interface resource situation of the client and can accurately sense a network status in real time, thereby reducing the load of the client.

Furthermore, after determining that it is worth adjusting the air interface resource, the base station needs to determine whether the variation of the code rate before and after the adjustment of the air interface resource of the client is greater than a code rate adjustment threshold, and to further determine whether needs to send the code rate adjustment indication information to the client, so as to ensure that the client can browse the streaming media content smoothly.

Embodiment 3

Figure 3:
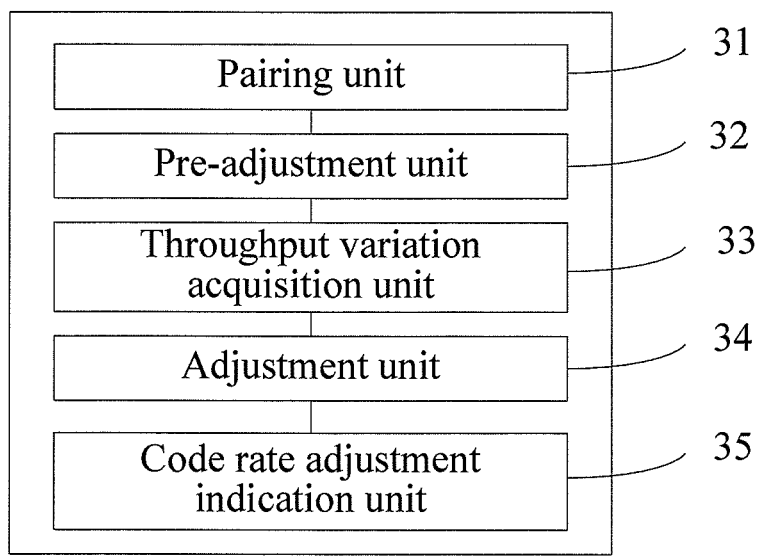
FIG. 3 is a block diagram of a device for improving a cell throughput based on a streaming media service according to Embodiment 3 of the present invention.

The embodiment of the present invention provides a device for improving a cell throughput based on a streaming media service. As shown in FIG. 3, the device includes a pairing unit 31, a pre-adjustment unit 32, a throughput variation acquisition unit 33, an adjustment unit 34, and a code rate adjustment indication unit 35.

The pairing unit 31 is configured to perform pairing on clients in the same cell that are performing a streaming media service, where the two clients in the same cell that are performing a streaming media service specifically are two paired clients of the clients in the same cell that are performing a streaming media service.

The pairing unit 31 is specifically configured to calculate a difference between a current channel quality sampling value of each client that is performing a streaming media service in the same cell and a channel quality sampling value of the client before a same time interval.

The pairing unit 31 divides, according to a positive or negative value of the difference between the two channel quality sampling values of the clients, the clients in the cell that are performing a streaming media service into two groups, sets priority levels for a group that has the differences between the two channel quality sampling values being positive values in accordance with a descending order the differences, and sets priority levels for the other group that has the differences between the two channel quality sampling values being negative values in accordance with an ascending order the differences.

For example, the time interval is 200 ms, a client that is a streaming media service in the cell reports the channel quality sampling value before 200 ms and the current channel quality sampling value, the pairing unit 31 calculates the difference ΔCQI between the current channel quality sampling value of the client and the channel quality sampling value before 200 ms, and then divides the clients into two groups P and Q according to positive and negative values of ΔCQI, as shown in Table 1 and Table 2, where Table 1 shows clients in the group P and Table 2 shows clients in the group Q.

For the clients in the group P, priority levels are set for the clients in accordance with a descending order of ΔCQI, the group P includes 11 clients, and the pairing unit 31 sets the priority levels of the clients to be 1, 2, 3, . . . , and 11 in sequence. The pairing unit 31 sets priority levels of the clients of the group Q in accordance with an ascending order of ΔCQI of the clients, the group Q includes 10 clients, and the priority levels of the clients are 1, 2, 3, . . . , and 10 in sequence. And then, pairing is performed on the clients with the same priority level in the group P and the group Q. For example, UE2 and UE 11 are paired, and UE4 and UE 13 are paired. The pairing is not performed on the last one client in the group P.

Specifically, the pairing unit 31 may further specifically be configured to: evenly divide the clients into a former group and a latter group in accordance with a descending order of current channel quality sampling values of the clients, and separately set the priority levels of the two groups of clients in accordance with the channel quality sampling values; and perform paring on the clients with the same priority level in the two groups in sequence.

For example, 9 clients are performing the streaming media service in the cell, the pairing unit 31 ranks the clients in accordance with the current channel quality sampling values reported by the 9 clients, and the ranking result is shown in Table 3.

Then, according to the sequence of the clients, the clients are evenly divided into a former group and a latter group, namely, a group P and a group Q. The clients in the group P are specifically shown in Table 4, and the clients in the group Q are specifically shown in Table 5.

Then, the pairing unit 31 sets the priority levels in accordance with the channel quality sampling values of the clients in the group P and the group Q, performs pairing on the clients with the same priority level in the two groups, for example, the clients UE11 and UE19 are paired, and UE13 and UE23 are paired. The pairing is not performed on the UE31 in the group Q.

The pre-adjustment unit 32 is configured to, for two clients in the same cell that are performing a streaming media service, pre-adjust an air interface resources allocated to the two clients, where the pre-adjusting an air interface resources is pre-adjusting the air interface resources of the two clients according to an air interface adjustment amount preset by a base station.

After the pairing is completed, the pre-adjustment unit 32 pre-adjusts the air interface resources of the paired clients, for example, the pre-adjusted air interface resource is transmit power allocated to the client by the base station.

The pre-adjustment unit 31 may be configured to pre-increase the transmit power allocated to the client having the difference between the two channel quality sampling values being a positive value in the paired clients, and pre-decrease the transmit power allocated to the client having the difference between the two channel quality sampling values being a negative value in the paired clients, where the increased amount of the transmit power of the client whose allocated transmit power is pre-increased is the same as the decreased amount of the transmit power of the client whose allocated transmit power is pre-decreased. As shown in Table 1 and Table 2, the client UE2 and the client UE11 are paired, the transmit power pre-allocated to the client UE2 by the pre-adjustment unit 32 is $P_j + \Delta P$, the transmit i power allocated to the client UE11 is $P_i - \Delta P$, where $P_j$ is the transmit power currently allocated to the UE2, $P_i$ is the transmit power currently allocated to the UE11.

The pre-adjustment unit 32 may further be specifically configured to pre-increase the transmit power allocated to the client having a large channel quality sampling value in the paired clients, and pre-decrease the transmit power allocated to the client having a small channel quality sampling value in the paired clients, where the increased amount of the transmit power of the client whose allocated transmit power is pre-increased is the same as the decreased amount of the transmit power of the client whose allocated transmit power is pre-decreased. As shown in Table 3, Table 4, and Table 5, the channel quality sampling value of the client UE11 is 22, the transmit power allocated to the client UE11 by the base station is $P_j$, the channel quality sampling value of the client UE19 is 18, the transmit power allocated to the client UE19 by the base station is $P_i$, in this way, after the base station pre-adjusts the transmit power of the client UE11 and the client UE19, the transmit power allocated to the client UE11 by the pre-adjustment unit 32 is $P_j+\Delta P$, and the transmit power allocated to the client UE19 is $P_i-\Delta P$ where $\Delta P$ is a transmit power adjustment amount preset by the base station.

In this embodiment, the channel quality sampling value may be one or a combination of more of parameters below, for example, a distance between the two clients and the base station, a cache consumption rate of each client in a cache of the base station, a size of an RRSI (Received Signal Strength Indication, received signal strength indication), and a channel signal-to-noise ratio of the client, which is not limited herein by the present invention.

The throughput variation acquisition unit 33 is configured to acquire a variation of a cell throughput that exists after the air interface resources of the two clients are pre-adjusted.

The throughput variation acquisition unit 33 calculates, according to the air interface resources pre-adjusted for the two clients, the throughputs of the two clients after the air interface resources are pre-adjusted, where a throughput specifically may be a service transmit rate of a client. Then, the throughput variation acquisition unit 33 calculates a difference between the throughputs of the two clients to obtain the variation of the cell throughput. Specifically, the throughput variation acquisition unit 33 may calculate the variation of the cell throughput that exists after the air interface resources of the two clients are pre-adjusted by adopting the following method:

$$\Delta T = \frac{W}{L} * \frac{(P_j + \Delta P) * G}{RSSI_j - (P_j + \Delta P) * G} - \frac{W}{L} * \frac{(P_i + \Delta P) * G}{RSSI_i - (P_i + \Delta P) * G}$$

where W, L, and L represent bandwidth, user service quality, and a channel large-scale loss of a cell, respectively, W and L have fixed values of 3.84 MHZ and 4.8 dB, respectively, G is a predicted value, $RSSI_j$ and $RSSI_i$ are a total receiving power of the client i and the client j, respectively, $P_j$ and $P_i$ are the transmit power currently allocated to the client i and the client j by the base station, respectively, and $\Delta P$ is the transmit power adjustment amount preset by the base station, where the air interface resource specifically is the transmit power allocated to the client by the base station.

The adjustment unit 34 is configured to: if the variation of the cell throughput that exists after the air interface resources of the two clients are pre-adjusted is greater than a preset resource adjustment threshold, allocate the pre-adjusted air interface resources to the two clients, so that the two clients can receive streaming media content having an adjusted code rate value from a media server.

The resource adjustment threshold is a value preset by the base station, and is used by the adjustment unit 34 to determine whether it is worth performing an air interface resource adjustment on the two clients If the variation of the cell throughput that exists after the air interface resources of the two clients are pre-adjusted is greater than the preset resource adjustment threshold, the adjustment unit 43 deems that after the air interface resource of the client is adjusted, the increased amount of the cell throughput is acceptable. In this way, the adjustment unit 34 separately allocates the pre-adjusted air interface resource to the two clients, so that the two clients can receive the streaming media content having an adjusted code rate value from the media server.

The code rate adjusting instruction unit 35 is configured to send code rate adjusting indication information to the two clients according the pre-adjusted air interface resources allocated to the two clients.

Specifically, the code rate adjustment indication information separately sent to the two clients by the code rate adjustment indication unit 35 according to the pre-adjusted air interface resources allocated to the two clients by the base station may specifically be: code rate increasing indication information and code rate decreasing indication information.

If the adjustment unit 34 increases the transmit power allocated to the client, the code rate adjustment indication unit 35 may send information of increasing the code rate value of a requested streaming media content to the client; and if the adjustment unit 34 decreases the transmit power allocated to the client, the code rate adjustment indication unit 35 may send information of decreasing the code rate value of the requested streaming media content to the client.

Specifically, the code rate adjustment indication information separately sent to the two clients by the code rate adjustment indication unit 35 according to the pre-adjusted air interface resources allocated to the two clients by the base station may specifically also be: streaming media content having an adjusted code rate value. If the adjustment unit 34 increases the transmit power allocated to the client, the code rate adjustment indication unit 35 may send streaming media content having an increased code rate value to the client; and if the adjustment unit 34 decreases the transmit power allocated to the client, the code rate adjustment indication unit 35 may send streaming media content having a decreased code rate value to the client.

Specifically, the code rate adjustment indication information separately sent to the two clients by the code rate adjustment indication unit 35 according to the pre-adjusted air interface resources allocated to the two clients by the base station may specifically also be: resource address information of the streaming media content having an adjusted code rate value. If the adjustment unit 34 increases the transmit power allocated to the client, the code rate adjustment indication unit 35 may send resource address information of streaming media content having a code rate value one level higher than the code rate value of the streaming media content currently requested by the client. If the adjustment unit 34 decreases the transmit power allocated to the client, the code rate adjustment indication unit 35 may send resource address information of streaming media content having a code rate value one level lower than the code rate value of the streaming media content currently requested by the client.

For example, the code rate of a streaming media resource currently stored by the media server includes:

Code rate (bps)
350000
470000
630000
845000
1130000

If the code rate value of the media resource content currently requested by the client j is 630000 bps, the code rate value of the media resource content currently requested by the client i is 470000 bps, when $\Delta T$ is greater than the preset resource adjustment threshold, the adjustment unit 34 increases the transmit power allocated to the client j by $\Delta P$, and decreases the transmit power allocated to the client i by $\Delta P$. In this way, the code rate value of the streaming media content requested by the client j can be increased to 845000 bps, and the code rate value of the streaming media content requested by the client i can be decreased to 350000 bps.

In this way, the code rate adjustment indication unit 35 may send information of increasing the code rate value of the requested streaming media content to the client j, for example, information of increasing to 845000 bps, and send information of decreasing the code rate of the requested streaming media content to the client i, for example, information of decreasing to 370000 bps.

Definitely, the code rate adjustment indication unit 35 may also directly acquire streaming media content having code rates of 845000 bps and 370000 bps and separately send the streaming media content to the client j and the client i.

Definitely, the code rate adjustment indication unit 35 may acquire storage address information of the streaming media content having a code rate of 845000 bps and a code rate of 370000 bps, and directly and separately send the storage address information to the client j and the client i.

In this way, the client does not need to monitor the bandwidth thereof in real time so as to switch the code rate value of the requested streaming media content, but only needs to receive the code rate adjustment indication information sent by the base station to perform code rate switching directly, so that the load of the client is decreased and the code rate value of the requested streaming media content can be switched in time.

Furthermore, the device may further include a client throughput determination unit, configured to determine whether a variation of the throughput before and after the adjustment of the transmit power allocated to the two clients is greater than a code rate switching threshold, where the code rate switching threshold is a value preset by the base station.

The code rate adjustment indication unit is specifically configured to: if the variation of the throughput before and after the adjustment of the transmit power allocated to the client whose allocated transit power is increased is greater than the code rate switching threshold, send code rate increasing indication information to the client; if the variation of the throughput before and after the pre-adjustment of the transmit power allocated to the client whose allocated transit power is decreased is greater than the code rate switching threshold, send code rate decreasing indication information to the client; and if the variation of the throughput before and after the adjustment of the transmit power allocated to the two clients is less than the code rate switching threshold, send code rate unchanging indication information.

Specifically, the throughput before and after the adjustment of the air interface resource of the client may be calculated by the client throughput determination unit according to the following equation:

$$\Delta T_j = \frac{W}{L} * \frac{(P_j + \Delta P) * G}{RSSI_j - (P_j + \Delta P) * G} - \frac{W}{L} * \frac{P_j * G}{RSSI_j - P_j * G}$$

where $\Delta P$ is the transmit power adjustment amount preset by the base station, and meanings of other parameters are the same as those in the equation above.

The transmit power allocated to the client j is increased by $\Delta P$, accordingly, the transmit power allocated to the client i paired with the client j is decreased by $\Delta P$, which specifically is:

$$\Delta T_i = \frac{W}{L} * \frac{P_i * G}{RSSI_i - P_i * G} - \frac{W}{L} * \frac{(P_i - \Delta P) * G}{RSSI_i - (P_i + \Delta P) * G}$$

For example, when the code rate value of the streaming media content currently requested by the client j is 630000 bps, the code rate value of the streaming media content currently requested by the client is 470000 bps, if the code rate threshold specifically is 180000 bps, when the variation of the throughput $\Delta T_j$ before and after the adjustment unit 34 adjusts the transmit power of the client j is greater than 180000 bps, the client may request a code rate value of 845000 bps, and when the $\Delta T_i$ is greater than 180000 bps, the code rate value of the streaming media requested by the client is required to be decreased to 350000 bps, so as to ensure that the client can browse the streaming media content smoothly. When $\Delta T_i$ and $\Delta T_j$ are less than 180000 bps, the code rate value of the streaming media requested by the client may keep unchanged.

In this way, before the code rate adjustment indication unit 35 sends the code rate adjustment indication information to the client, the variation of the throughput of the client is further determined, so as to determine whether the code rate value of the requested streaming media content can be adjusted after the air interface resource is adjusted, so that in the case that the cell throughput is increased, it is ensured that the client can browse the streaming media content smoothly.

In the device for improving a cell throughput based on a streaming media service according to the embodiment of the present invention, the pre-adjustment unit is configured to pre-adjust the air interface resources for any two clients in the same cell that are performing a streaming media service, and the throughput variation acquisition unit determines whether a difference of the code rates of the each two clients after the pre-adjustment is greater than a resource adjustment threshold, so as to determine whether it is worth performing, by a base station, an air interface resource adjustment action on the paired clients. If the difference of the code rates of the paired clients after the pre-adjustment is greater than the resource adjustment threshold, the pre-adjusted air interface resource is provided for the client, thereby improving the cell throughput.

Furthermore, the code rate adjustment indication unit may also provide code rate indication information according to the pre-adjusted air interface resource allocated to the client, so that the client can adjust the code rate of the requested streaming media without automatically detecting the air interface resource situation of the client and can accurately sense a network status in real time, thereby reducing the load of the client.

Furthermore, after determining that it is worth adjusting the air interface resource, the client throughput determination unit needs to determine whether the variation of the code rate before and after the adjustment of the air interface resource of the client is greater than a code rate adjustment threshold, and to further determine whether to send the code rate adjustment indication information to the client, so as to ensure that the client can browse the streaming media content smoothly.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a Read Only Memory (ROM), a Random Access Memory (RAM), a magnetic disk or an optical disc.

The foregoing descriptions are merely several embodiments of the present invention, but not intended to limit the present invention. Various variations and modifications made by persons skilled in the art without departing from the technical scope disclosed in the present invention fall within the protection scope of the present invention. Therefore, the protection scope of the present invention is subject to the appended claims.

What is claimed is:

1. A method for improving a cell throughput based on a streaming media service, the method comprising:
pre-adjusting an air interface resource separately allocated to two clients in a same cell that are performing a streaming media service, wherein pre-adjusting an air interface resource comprises pre-adjusting the air interface resources of the two clients according to an air interface adjustment amount preset by a base station, the two clients selected from different groups based on channel quality sampling values and paired together in response to having a same priority level in their respective groups;
acquiring a variation of a cell throughput that exists after the air interface resources of the two clients are pre-adjusted; and,
allocating the pre-adjusted air interface resources to the two clients in response to the variation of the cell throughput that exists after the air interface resources of the two clients are pre-adjusted being greater than a preset resource adjustment threshold, so that the two clients are capable of receiving streaming media content having an adjusted code rate value from a media server.

2. The method according to claim 1, further comprising:
sending code rate adjustment indication information to the two clients according to the pre-adjusted air interface resource allocated to the two clients.

3. The method according to claim 2, wherein sending code rate adjustment indication information to the two clients according to the pre-adjusted air interface resource allocated to the two clients, comprises:
separately sending code rate increasing indication information and code rate decreasing indication information to the two clients according to the pre-adjusted air interface resource allocated to the client; or
separately sending streaming media content having an adjusted code rate value to the two clients according to the pre-adjusted air interface resource allocated to the client; or
separately sending resource address information of streaming media content having an adjusted code rate value to the two clients according to the pre-adjusted air interface resource allocated to the client.

4. The method according to claim 1, further comprising:
wherein pre-adjusting, according to a channel quality sampling value of two clients in the same cell that are performing a streaming media service, an air interface resource allocated to the two clients, wherein pre-adjusting an air interface resource comprises pre-adjusting the air interface resources of the two clients according to an air interface adjustment amount preset by a base station, comprises:
pre-adjusting the air interface resource allocated to the two clients according to the channel quality sampling values of the two clients in the same cell that are performing a streaming media service.

5. The method according to claim 4, wherein:
performing pairing on clients in the same cell that are performing a streaming media service refers to performing pairing according to the channel quality sampling value of the client, comprises:
calculating a difference between a current channel quality sampling value of each client that is performing a streaming media service in the same cell and a channel quality sampling value of the client before a same time interval,
according to a positive or negative value of the difference between the two channel quality sampling values of each client, dividing the clients in the cell that are performing a streaming media service into two groups, setting priority levels for a group that has first differences between the two channel quality sampling values being positive values in accordance with a descending order of the first differences, and setting priority levels for the other group that has second differences between the two channel quality sampling values being negative values in accordance with an ascending order of the second differences, and
performing paring on the clients with a same priority level in the two groups in sequence; and
for two clients in the same cell that are performing a streaming media service, pre-adjusting an air interface resource allocated to the two clients, comprises:
pre-increasing transmit power allocated to a client having a difference between the two channel quality sampling values being a positive value in the paired clients, and pre-decreasing transmit power allocated to a client having a difference between the two channel quality sampling values being a negative value in the paired clients, wherein an increased amount of the transmit power of the client whose allocated transmit power is pre-increased is the same as a decreased amount of the transmit power of the client whose allocated transmit power is pre-decreased.

6. The method according to claim 4, wherein:
performing pairing on clients in the same cell that are performing a streaming media service refers to performing pairing according to the channel quality sampling value of the client, comprises:
evenly dividing the clients into a former group and a latter group in accordance with a descending order of current channel quality sampling values of the clients, and separately setting priority levels for the two groups of the clients in accordance with the channel quality sampling values, and
performing paring on the clients with a same priority level in the two groups in sequence; and
for two clients in the same cell that are performing a streaming media service, pre-adjusting an air interface resource allocated to the two clients, comprises:
pre-increasing transmit power allocated to a client having a large channel quality sampling value in the paired clients, and pre-decreasing transmit power allocated to a client having a small channel quality sampling value in the paired clients, wherein an increased amount of the transmit power of the client whose allocated transmit power is pre-increased is the same as a decreased amount of the transmit power of the client whose allocated transmit power is pre-decreased.

7. The method according to claim 5, further comprising:
determining whether a variation of the throughput before and after the adjustment of the transmit power allocated to the two clients is greater than a code rate switching threshold, wherein the code rate switching threshold is a value preset by the base station; and
if the variation of the throughput before and after the adjustment of the transmit power allocated to the client whose allocated transit power is increased is greater than the code rate switching threshold, sending code rate increasing indication information to the client; if the variation of the throughput before and after the pre-adjustment of the transmit power allocated to the client whose allocated transit power is decreased is greater than the code rate switching threshold, sending code rate decreasing indication information to the client; and if the variation of the throughput before and after the adjustment of the transmit power allocated to the two clients is less than the code rate switching threshold, sending code rate unchanging indication information.

8. The method according to claim 1, wherein the variation of the cell throughput is obtained according to the following equation:

$$\Delta T = \frac{W}{L} * \frac{(P_j + \Delta P) * G}{RSSI_j - (P_j + \Delta P) * G} - \frac{W}{L} * \frac{(P_i + \Delta P) * G}{RSSI_i - (P_i + \Delta P) * G},$$

wherein, $\Delta T$ is the variation of the cell throughput; W, L, and G represent bandwidth, user service quality, and channel large-scale loss of the cell, respectively; W and L have fixed values of 3.84 MHZ and 4.8 dB, respectively; G is a predicted value; $RSSI_j$ and $RSSI_i$ are a total receiving power of a client i and a client j, respectively; $P_j$ and $P_i$ are the transmit power provided for the client i and the client j by the base station, respectively; and $\Delta P$ is a transmit power adjustment amount preset by the base station.

9. A base station for improving a cell throughput based on a streaming media service, the base station comprising:
a memory configured to store data and instruction code; and
a hardware device, upon executing the instruction code, configured to:
for two clients in the same cell that are performing a streaming media service, pre-adjust an air interface resource allocated to the two clients, wherein pre-adjusting an air interface resource comprises pre-adjusting the air interface resources of the two clients according to an air interface adjustment amount preset by a base station, the two clients selected from different groups based on channel quality sampling values and paired together in response to having a same priority level in their respective groups;
acquire a variation of a cell throughput that exists after the air interface resources of the two clients are pre-adjusted; and
allocate the pre-adjusted air interface resources to the two clients in response to the variation of the cell throughput that exists after the air interface resources of the two clients are pre-adjusted being greater than a preset resource adjustment threshold, so that the two clients are capable of receiving streaming media content having an adjusted code rate value from a media server.

10. The base station according to claim 9, wherein the hardware device is further configured to:
send code rate adjustment indication information to the two clients according the pre-adjusted air interface resource allocated to the two clients.

11. The base station according to claim 10, wherein the hardware device is configured to:
separately send code rate increasing indication information and code rate decreasing indication information according the pre-adjusted air interface resource allocated to the two clients; or
separately send streaming media content having an adjusted code rate value to the two clients according to the pre-adjusted air interface resource allocated to the client; or
separately send resource address information of streaming media content having an adjusted code rate value to the two clients according to the pre-adjusted air interface resource allocated to the client.

12. The base station according to claim 9, wherein the hardware device is further configured to:
perform pairing on clients in the same cell that are performing a streaming media service according to a channel quality sampling value of the client, so as to acquire paired clients; and
pre-adjust the air interface resource allocated to the paired clients according to the channel quality sampling value of the paired clients in the same cell that are performing a streaming media service.

13. The base station according to claim 12, wherein:
the hardware device is further configured to:
calculate a difference between a current channel quality sampling value of each client that is performing a streaming media service in the same cell and a channel quality sampling value of the client before a same time interval,
according to a positive or negative value of the difference between the two channel quality sampling values of each client, divide the clients in the cell that are performing a streaming media service into two groups, set priority levels for a group that has first differences between the two channel quality sampling values being positive values in accordance with a descending order of the first differences, and set priority levels for the other group that has second differences between the two channel quality sampling values being negative values in accordance with an ascending order of the second differences,
perform pairing on the clients with a same priority level in the two groups in sequence;
pre-increase transmit power allocated to a client having the difference between the two channel quality sampling values being a positive value in the paired clients, and
pre-decrease transmit power allocated to a client having the difference between the two channel quality sampling values being a negative value in the paired clients, wherein an increased amount of the transmit power of the client whose allocated transmit power is pre-increased is the same as a decreased amount of the transmit power of the client whose allocated transmit power is pre-decreased.

14. The base station according to claim 12, wherein:
the hardware device is further configured to:
evenly divide the clients into a former group and a latter group in accordance with a descending order of current channel quality sampling values,
separately set priority levels for the two groups of the clients in accordance with the channel quality sampling values,
perform paring on the clients with a same priority level in the two groups in sequence,
pre-increase transmit power allocated to a client having a large channel quality sampling value in the paired clients, and
pre-decrease transmit power allocated to a client having a small channel quality sampling value in the paired clients, wherein an increased amount of the transmit power of the client whose allocated transmit power is pre-increased is the same as a decreased amount of the transmit power of the client whose allocated transmit power is pre-decreased.

15. The base station according to claim 13, wherein the hardware device is further configured to:
 determine whether the variation of the throughput before and after the adjustment of the transmit power allocated to the two clients is greater than a code rate switching threshold, wherein the code rate switching threshold is a value preset by the base station; and
 if the variation of the throughput before and after the adjustment of the transmit power allocated to the client whose allocated transit power is increased is greater than the code rate switching threshold, send code rate increasing indication information to the client,
 if the variation of the throughput before and after the pre-adjustment of the transmit power allocated to the client whose allocated transit power is decreased is greater than the code rate switching threshold, send code rate decreasing indication information to the client, and
 if the variation of the throughput before and after the adjustment of the transmit power allocated to the two clients is less than the code rate switching threshold, send code rate unchanging indication information.

16. A method for improving a cell throughput based on a streaming media service, the method comprising:
 pre-adjusting an air interface resource separately allocated to two clients in a same cell that are performing a streaming media service, the two clients selected from different groups based on channel quality sampling values and paired together based on having a same priority level in their respective groups, wherein pre-adjusting an air interface resource comprises:
  increasing the air interface resource allocated to the first client of the two clients and decreasing the air interface resource allocated to the second client of the two clients; where the increased amount for the first client is equal to the decreased amount for the second client;
  acquiring a variation of a cell throughput that exists after the air interface resources of the two clients are pre-adjusted; and
  allocating the pre-adjusted air interface resources to the two clients in response to the variation of the cell throughput that exists after the air interface resources of the two clients are pre-adjusted being greater than a preset resource adjustment threshold, so that the two clients can receive streaming media content having an adjusted code rate value from a media server.

17. The method according to claim 16, wherein increasing the air interface resource allocated to the first client of the two clients and decreasing the air interface resource allocated to the second client of the two clients comprises:
 increasing the transmit power allocated to the first client having a larger channel quality sampling value of the two clients, and decreasing the transmit power allocated to the second client having a smaller channel quality sampling value of the two clients.

18. The method according to claim 16, wherein increasing the air interface resource allocated to the first client of the two clients and decreasing the air interface resource allocated to the second client of the two clients, comprises:
 increasing the transmit power allocated to the first client having a difference between two channel quality sampling values of the first client over a time interval being a positive value, and decreasing the transmit power allocated to the second client having the difference between two channel quality sampling values of the second client over the time interval being a negative value.

19. The method according to claim 16, further comprising:
 sending code rate adjustment indication information to the two clients according to the pre-adjusted air interface resource allocated to the two clients.

20. The method according to claim 19, wherein sending code rate adjustment indication information to the two clients according to the pre-adjusted air interface resource allocated to the two clients, comprises:
 separately sending code rate increasing indication information and code rate decreasing indication information to the two clients according to the pre-adjusted air interface resource allocated to the client; or
 separately sending streaming media content having an adjusted code rate value to the two clients according to the pre-adjusted air interface resource allocated to the client; or
 separately sending resource address information of streaming media content having an adjusted code rate value to the two clients according to the pre-adjusted air interface resource allocated to the client.

21. The method according to claim 16, further comprising:
 determining whether a variation of the throughput before and after the adjustment of the transmit power allocated to the two clients is greater than a code rate switching threshold, wherein the code rate switching threshold is a value preset by the base station; and
 if the variation of the throughput before and after the adjustment of the transmit power allocated to the client whose allocated transit power is increased is greater than the code rate switching threshold, sending code rate increasing indication information to the client; if the variation of the throughput before and after the pre-adjustment of the transmit power allocated to the client whose allocated transit power is decreased is greater than the code rate switching threshold, sending code rate decreasing indication information to the client; and if the variation of the throughput before and after the adjustment of the transmit power allocated to the two clients is less than the code rate switching threshold, sending code rate unchanging indication information.

22. The method according to claim 16, wherein the variation of the cell throughput is obtained according to the following equation:

$$\Delta T = \frac{W}{L} * \frac{(P_j + \Delta P) * G}{RSSI_j - (P_j + \Delta P) * G} - \frac{W}{L} * \frac{(P_i + \Delta P) * G}{RSSI_i - (P_i + \Delta P) * G},$$

wherein, $\Delta T$ is the variation of the cell throughput; W, L, and G represent bandwidth, user service quality, and channel large-scale loss of the cell, respectively; W and L have fixed values of 3.84 MHZ and 4.8 dB, respectively; G is a predicted value; $RSSI_j$ and $RSSI_i$ are a total receiving power of a client i and a client j, respectively; $P_j$ and $P_i$ are the transmit power provided for the client i and the client j by the base station, respectively; and $\Delta P$ is a transmit power adjustment amount preset by the base station.

* * * * *